(No Model.)
J. W. ALLAN.
WAGON BRAKE.
No. 489,175.   Patented Jan. 3, 1893.
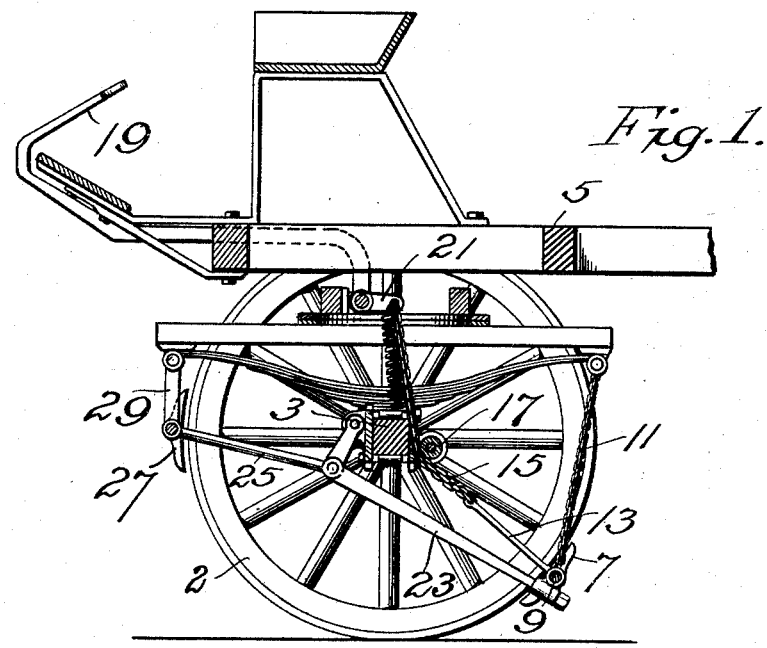
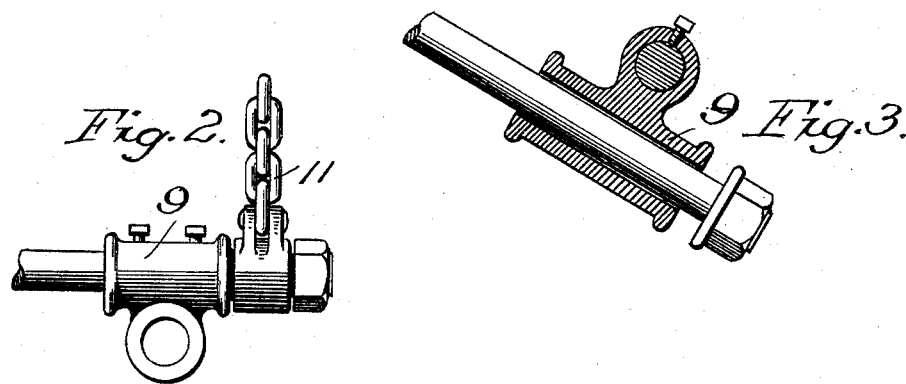
Witnesses.
C. E. Van Doren.
Inventor,
John W. Allan
By Paul Merwin
his Attorneys.

UNITED STATES PATENT OFFICE.

JOHN W. ALLAN, OF MINNEAPOLIS, MINNESOTA, ASSIGNOR OF THREE-FOURTHS TO ROBERT EHRENBERG AND AUGUSTUS H. RUNGE, OF SAME PLACE.

WAGON-BRAKE.

SPECIFICATION forming part of Letters Patent No. 489,175, dated January 3, 1893.

Application filed June 18, 1892. Serial No. 437,167. (No model.)

*To all whom it may concern:*

Be it known that I, JOHN W. ALLAN, of Minneapolis, in the county of Hennepin and State of Minnesota, have invented certain Improvements in Wagon-Brakes, of which the following is a specification.

This invention relates to improvements in wagon brakes and the invention consists generally in providing a brake having one shoe adapted to be clamped upon the wheel by the driver and having a second shoe that is drawn against the wheel by the motion imparted to the first shoe by the wheel.

In the accompanying drawings forming a part of this specification. Figure 1 is a partial side elevation and section of a portion of a frame having my invention applied thereto. Figs. 2 and 3 are details.

In the drawings, 2 represents one of the wagon wheels which may be of any ordinary construction.

3 represents the axle and 5 a portion of the wagon body.

A brake shoe 7 is pivotally supported upon a sleeve 9 and is supported in position by means of a suitable chain 11. A rod 13 is also connected to the shoe 7 and this rod is connected by a chain 15 preferably passing under a roll 17 to a suitable foot or hand lever 19 having a crank arm 21 to which the chain is connected. By this means the shoe 7 is supported in close proximity to the circumference of the wheel, and when it is desired to apply the brake, the lever 19 is operated and the shoe 7 is brought against the surface of the wheel in the usual manner.

The sleeve 9 upon which the shoe 7 is supported is arranged upon a bell crank lever 23. This lever is suitably supported upon the axle and a rod 25 connects said lever with a shoe 27 supported by means of a link 29 from any suitable part of the running gear. It will thus be seen that when the brake shoe 7 is brought against the circumference of the wheel and clamped thereto the motion of the wheel will throw the lever 23 and rod 25, clamp the shoe 27 upon the wheel and draw said shoe over firmly against said surface. By this means a very slight exertion upon the part of the driver or person operating the lever 19 is required to firmly apply the brake to the wheel.

It will be understood that I do not limit myself to applying this brake to any particular kind of wagon or vehicle as the same is readily applicable to all kinds of vehicles or cars.

I claim as my invention—

1. The combination with the axle and the wheel, of the brake shoe 7, the sleeve 9 upon which said shoe is secured, means for bringing the said shoe against the surface of the wheel, the bell crank lever 23 pivoted at one end upon the axle and upon which said sleeve 9 is mounted and is free to slide, the shoe 27, and the rod 25 connecting the lever 23 with said shoe 27, substantially as described.

2. The combination with the wheel, of the brake shoe 7, the sleeve 9 upon which said shoe is secured, the chain 11 supporting said sleeve and shoe, the rod 13 connected to said shoe, the operating lever 19 provided with a crank arm 21, the chain 15 connecting said crank arm with the rod 13, the lever 23 upon which the sleeve 9 is mounted and is free to slide, the shoe 27, the link 29 supporting said shoe and the rod 25 connecting said shoe 27 with said lever 23, all substantially as described.

3. The combination in a wagon brake, of the wheel, with the axle, the wagon spring, a brake shoe suspended by a link from the forward end of said spring, a bell crank lever 23 pivoted on the axle, the rod 25 connecting said crank with said shoe, a shoe 7 slidably mounted on the lower end of said part 23, a chain 11 for supporting the said shoe 7 when disengaged from the wheel, a chain for drawing said shoe 7 into engagement with the wheel and means for operating the chain, substantially as described.

In testimony whereof I have hereunto set my hand this 15th day of June, 1892.

JOHN W. ALLAN.

In presence of—
  A. C. PAUL,
  FREDERICK S. LYON.